United States Patent [19]

Groves et al.

[11] 4,456,789

[45] Jun. 26, 1984

[54] AUDIO TELECONFERENCING

[75] Inventors: Ian S. Groves; David R. Guard; John G. Bunting; Christopher E. Rowlands, all of Ipswich; Edwin J. Powter, Saxmundham; David W. J. Holmes, Stowmarket; Graham J. Trott, Felixstowe, all of England

[73] Assignee: The Post Office, London, England

[21] Appl. No.: 17,280

[22] Filed: Mar. 5, 1979

[30] Foreign Application Priority Data

Mar. 7, 1978 [GB] United Kingdom ................. 9022/78

[51] Int. Cl.³ ............................................ H04M 3/56
[52] U.S. Cl. ............................................... 179/18 BC
[58] Field of Search ................ 179/1 CN, 18 BC, 1 P

[56] References Cited

U.S. PATENT DOCUMENTS

| 3,818,139 | 6/1974 | Snyder | 179/18 BC |
| 3,947,639 | 3/1976 | Nicholas et al. | 179/18 BC |
| 4,008,376 | 2/1977 | Flanagan et al. | 179/18 BC |
| 4,063,033 | 12/1977 | Harbert et al. | 381/94 |
| 4,068,092 | 1/1978 | Ikoma et al. | 381/94 |
| 4,139,731 | 2/1979 | Hashemi et al. | 179/18 BC |

Primary Examiner—Thomas W. Brown
Attorney, Agent, or Firm—Cushman, Darby & Cushman

[57] ABSTRACT

A control unit for controlling operation of a plurality of audio teleconference terminals comprises a plurality of inputs which are connected each to a particular terminal. A speech detector detects from which terminals speech signals are received and actuates switching means to connect those terminals in open loop teleconference.

14 Claims, 7 Drawing Figures

AUDIO TELECONFERENCING

This invention relates to audio teleconferencing and particularly relates to a control unit for controlling a plurality of audio teleconference terminals.

A typical audio teleconference arrangement allows one or more persons seated around a conference table at a first location or terminal to converse with other persons situated at a second location. The person or group of persons at the first location is provided with a terminal unit including a loudspeaker and one or more microphones which are linked by control equipment and a telephone circuit to loudspeakers and microphones at the second location. U.K. Patent Application No. 40777/78 describes a terminal unit for an audio teleconferencing system having one or more microphones each of which has a sensitivity which is directionally dependent and exhibits at least one null or substantially null position, the or each microphone being orientated so that its null position is directed towards the loudspeaker.

In such an arrangement it is not necessary for a conferee to switch off his microphone when he is not speaking since there is little or no feedback from the loudspeaker to the microphone. Application No. 40777/78 describes a two-terminal, non-switched, open loop, audio teleconference arrangement which operates over a private telephone circuit. A control unit which permits the use of the arrangement over the public switched telephone network (PSTN) is described in U.K. Application No. 50517/77.

In addition to a two terminal arrangement there is demand for an audio teleconferencing arrangement which will allow conferees at several locations to converse simultaneously. A problem which arises when a plurality of non-switched open loop audio teleconference terminals are interconnected is that of feedback. If, for example, an additional 4-wire terminal is connected in parallel to the two terminal arrangement of Application No. 40777/78, additional feedback paths are created. Two types of feedback path occur: that via a single loudspeaker to microphone path of the additional terminal and that via the loudspeaker to microphone paths of the other two terminals. If further terminals are added the number of feedback paths multiply rapidly. In order that the system can operate, the gain of each terminal has to be reduced and this means that the received speech level at each terminal is reduced. This approach is therefore unacceptable.

The present invention provides a control unit for controlling operation of a plurality of audio teleconference terminals in such a way that the problems described above are alleviated. The control unit is designed particularly, but not exclusively, for use with terminals of the type described in U.K. Patent Application No. 40777/78.

According to one aspect of the present invention there is provided a control unit for controlling operation of a plurality of audio teleconference terminals comprising a plurality of inputs each being for connection to a respective teleconference terminal so that it can receive speech signals therefrom, normally open switching devices connecting each input to a plurality of outputs, each output being associated with a particular input, the arrangement being such that when a switching device is closed the input associated with that switching device is connected to all outputs other than the one with which it is associated, and a control unit responsive to speech signals from said inputs to control said switching devices such that at lest some of said inputs at which speech signals are received are connected to said outputs.

In one arrangement the control unit can recognise a pair of terminals are active at a particular instant and connect these two terminals in open loop audio teleconference, the remaining terminals receiving the speech signals from said two terminals. The pair of terminals are connected so that one can receive speech signals from the other. The control unit retains the two terminals connected until speech is detected from a third terminal. The control unit then connects the third terminal in open loop audio teleconference with the terminal of the previous speaker, the other terminal being disconnected.

The control unit may include a plurality of speech detectors, one associated with each input, a comparator connected to the output of each speech detector, each comparator being arranged to change state when the signal it receives from its associated speech detector exceeds a predetermined level, a bistable state circuit connected to the output of each comparator circuit, each bistable state circuit having an output connected to one of said switching device, and sensors for sensing when two of said comparators change state to produce a clock signal for the bistable state circuits whereby the bistable state circuits associated with said two comparators each produce a signal to effect closing of two switching devices. Each comparator may have a reference input which receives a sawtooth waveform.

Each speech detector may include a rectifier, a peak detector, a trough detector and a differential amplifier for producing a signal indicative of the difference between the peak and trough detector outputs.

Each input may be connected to its associated switching device by a variable gain amplifier. Each output may have an amplifier and each switching device may be connected to the output amplifiers by a mixing bus.

Each switching device may have a delay circuit for delaying operation thereof until the speech level in the speech path to the switching device is substantially zero.

In an alternative arrangement the control unit includes a microprocessor which is arranged to sequentially scan the inputs to the control unit and control operation of said switching means such that those inputs which receive speech signals are connected in open loop audio teleconference. In this arrangement each switching device comprises an attenuator whose attenuation is normally high, the attenuation value of each attenuator being adjustable by said microprocessor such that if speech signals are received from two terminals the signals are transmitted at full level but if speech signals are received from more than two terminals, they are transmitted at progressively lower levels.

Each input of the control unit may be connected to a speech detector. Each speech detector may be connected to one input of a multiplexer, the multiplexer being connected by an analogue-to-digital converter and an interface circuit to the microprocessor. One input to the multiplexer may be a reference input.

According to another aspect of the present invention there is provided a speech detector circuit for minimising noise components in electrical signals indicative of speech comprising a rectifier for receiving said electrical signals, a peak detector connected to receive the output of said rectifier, a trough detector connected to the output of said peak detector, and a differential amplifier having a first input connected to the output of said peak detector and a second input connected to the output of said trough detector. The differential amplifier subtracts the trough detector output from the peak detector output to produce a waveform representative of the input speech component in the electrical signal. The detector circuit may include a bandpass filter for filtering the electrical signals prior to their rectifications.

The invention will be described now by way of example only with particular reference to the accompanying drawings. In the drawings.

Figure 1:
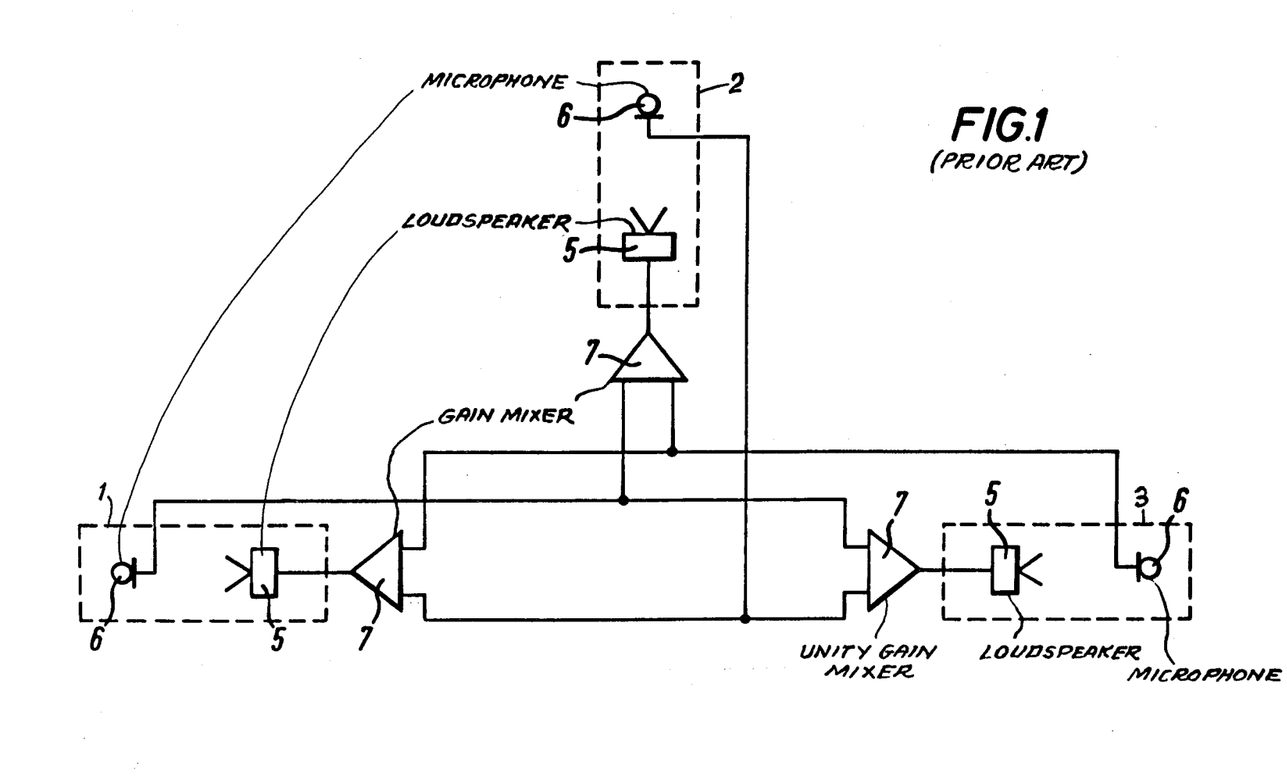
FIG. 1 illustrates the manner in which audio teleconference terminals can be connected in an open loop configuration.

The present specification is concerned with a control unit for controlling a plurality of audio teleconference terminals. A typical teleconference terminal with which the present control unit can be used is described in U.K. Application No. 40777/78. The description in Application No. 40777/78 relates to teleconferencing between two locations. When teleconferencing is carried out between more than two locations with a non-switched open loop configuration there is a problem that it is difficult for the participants to obtain an adequate received speech level from distant terminals without incurring objectional feedback effects such as howl, ringing or colouration of the speech signal. Three terminals 1, 2, 3 each having a loudspeaker 5 and at least one microphone 6, can be connected in an open loop configuration using unity gain mixers 7 as shown in FIG. 1 of the drawings. In effect this comprises two terminals as described in Application No. 40777/78 with an additional four-wire terminal of similar gain connected in parallel with the two location arrangement. The problem with the arrangement shown in FIG. 1, however, is that additional feedback paths are created. Two types of feedback path occur: one is simple and via a single loudspeaker to microphone path and the other is complex and via the loudspeaker to microphone paths of two distant terminals. If additional terminals are added to the arrangement shown in FIG. 1 the number of possible feedback paths increases rapidly. On the suspension that all terminals are identical and that the feedback signals added in phase, a simple worst case analysis shows that to keep a system with n terminals stable, the gain of each terminal must be reduced by $$20 \log (n-1) \text{ decibels} \qquad (1)$$

with respect to a two location operation. Such a reduction in gain is unacceptable.

The present description is concerned with a control unit for controlling a plurality of audio teleconference terminals each of which comprises a four-wire private circuit audio teleconference unit of the type described in Application No. 40777/78 and which are connected in star formation to the control unit. Two distinct forms of control unit will be described, one being a hard wired logic control unit and the other being a microprocessor control unit.

Figure 2:
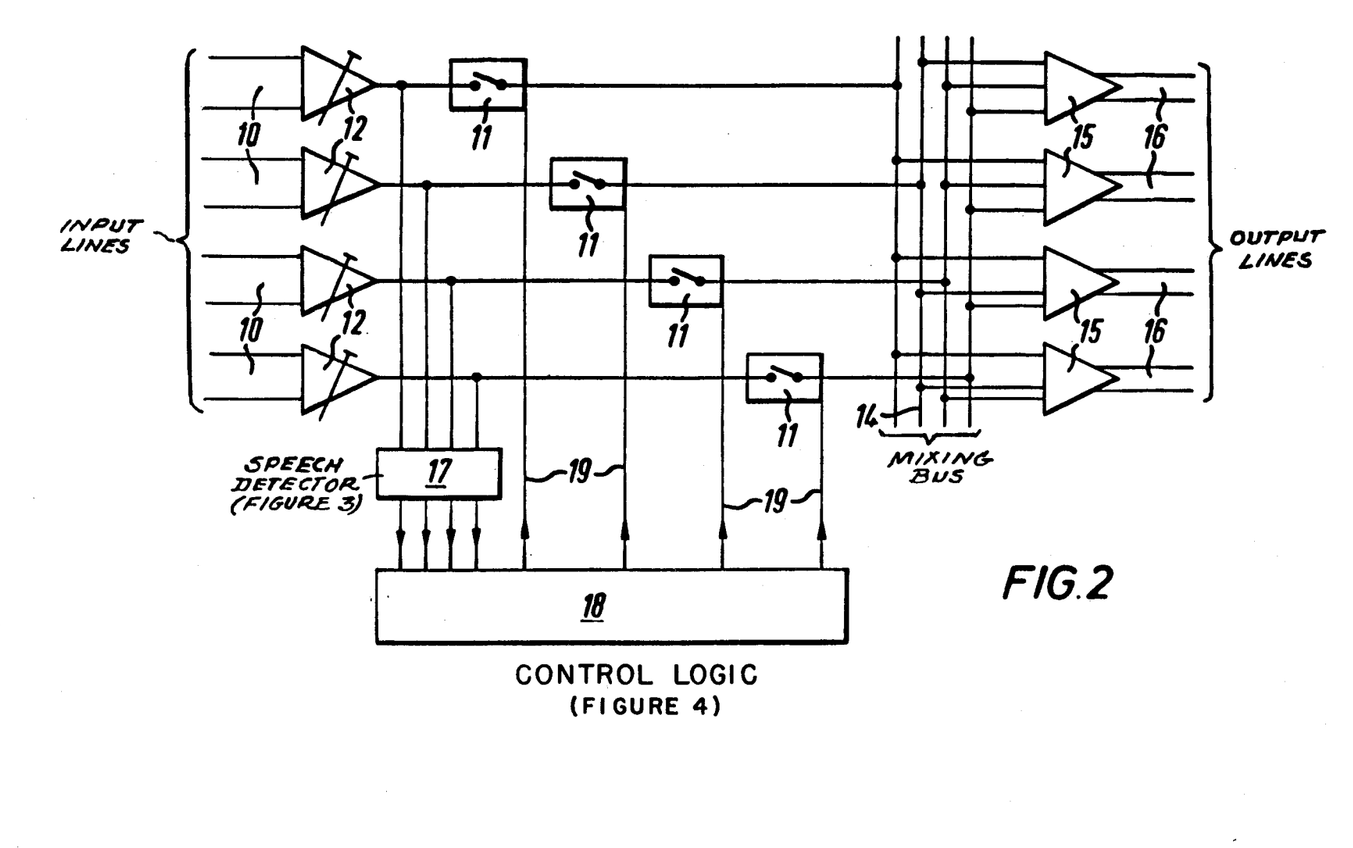
FIG. 2 illustrates a control unit in accordance with the present invention for connecting audio teleconference terminals.

The hard wired logic control unit is shown schematically in FIG. 2. It comprises a plurality of input lines 10 each associated with a particular teleconference terminal. Four sets of input lines are shown in FIG. 2. Each input line is connected to receive signals from a microphone at one of the teleconference terminals. Each input line is connected to an amplifier 12. Each amplifier 12 has a balanced input and the gain of each amplifier can be adjusted in order to compensate any loss which has occurred as a result of transmission from a terminal to the amplifier. The amplifiers are so adjusted that the signals at the outputs of the amplifiers have the same nominal level. The output of each amplifier 12 is connected by a switch 11 and a mixing bus 14 to selected ones of four mixing amplifiers 15. Each mixer amplifier has an output line 16 which is connected to a loudspeaker or loudspeakers at an associated terminal. Each of the amplifiers 12 is associated with a particular terminal and similarly each of the amplifiers 15 is associated with a particular terminal. The arrangement of the mixing bus 14 is such that a particular amplifier 12 when its associated switch 11 is closed can be connected to loudspeakers at all of the other terminals but not to loudspeakers at its own terminal.

The output of each amplifier 12 is also connected to a speech detectors switch 17. The speech detector is arranged to provide a slowly varying waveform the level of which indicates the presence or otherwise of speech from a terminal associated with an amplifier 12. Each amplifier 12 has its own speech detector in speech detectors unit 17. The speech detectors are connected to control logic 18. The control logic 18 operates to control the condition of the switches 11 by way of lines 19 on the basis of signals received from the speech detectors unit 17.

The control logic 18 is designed to sense which pair of terminals are active at any one time, i.e. those from which speech signals are being transmitted, and to connect those to terminals in open loop audio teleconference. This is done by closing the two switches 11 associated with the particular pair of active terminals so that all the other terminals can hear the speech from those two terminals. The pair of terminals connected in open loop audio teleconference at any instant use the system in the same manner as a two location arrangement so that each can hear the comments of the other. The control logic 18 is arranged to maintain the two terminals connected until a conferee at a third terminal wishes to join the conversation. The logic recognises the presence of speech from that third terminal and reconfigures the switches 11 so that the third terminal is connected in open loop audio teleconference with the terminal of the previous speaker. In this way the control unit reorders the terminal pair connected at any one time to follow the natural flow of conversation during the conference.

Figure 3:
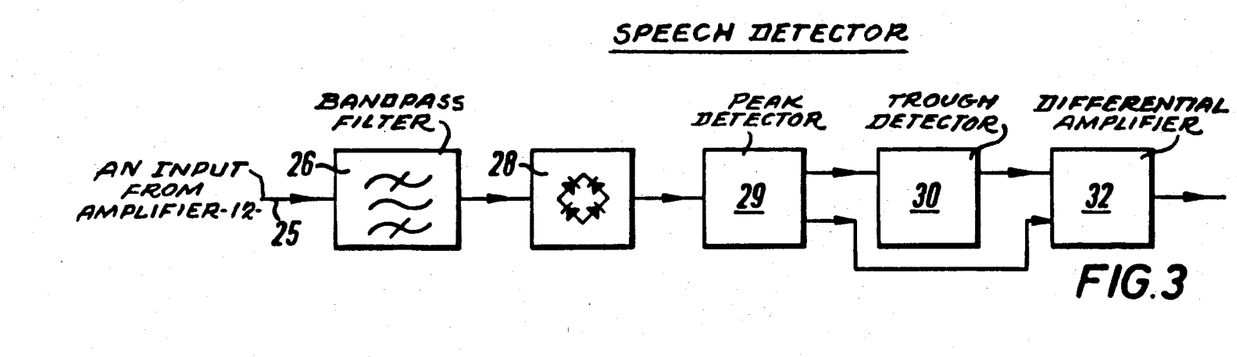
FIG. 3 is a block circuit diagram of part of the control unit of FIG. 2.

An example of a speech detector as included in speech detectors unit 17 is shown in greater detail in FIG. 3. The speech detector shown in FIG. 3 has an input line 25 which is connected to the output of one of the amplifiers 12. Input line 25 is connected to a bandpass filter 26 the passband of which is 300-2250 Hz. The filter 26 is arranged to restrict the sensitivity of the speech detector to the audio frequency band. The filter 26 is connected to a full wave rectifier 28 which is connected in turn to a peak detector 29. The peak detector 29 has an attack time constant of approximately 2 milliseconds and a decay time constant of approximately 500 milliseconds. The peak detector 29 has two outputs, the first of which is connected to an input of a trough detector 30 and the second of which is connected to one input of a differential amplifier 32. The other input to the differential amplifier 32 is from the trough detector 30. The trough detector 30 performs an inverse function of the peak detector and its output is arranged to fall rapidly to any minimum value of the peak detector output signal and to rise very slowly towards the current output level. The fall time constant of the trough detector is of the order of 10 milliseconds and the rise time constant is of the order of 20 seconds.

In operation the output of the trough detector 30 quickly assumes a value equal to the minimum level of the input signal to the speech detector on line 25. Thus, the output of the trough detector normally represents either the level of room noise or that of any constant value signal present in the input signal. The differential amplifier 32 subtracts the output of the trough detector from that of the peak detector 29. The output of the differential amplifier 32 is the output of the speech detector and is a slowly varying unipolar waveform representing the current peak value of the input speech signal. Any room noise or constant level components are removed by the speech detector. The inclusion of the room noise rejection facility gives each terminal a more equal opportunity of being admitted by the control logic to a conference as well as avoiding always reverting to the pair of terminals with the highest room noise during periods of no speech. The fast attack time of the speech detector minimises first syllable clipping and the decay time constant of around 500 milliseconds provides a delay to prevent premature switching by the control logic during intersyllable pauses.

Figure 4:
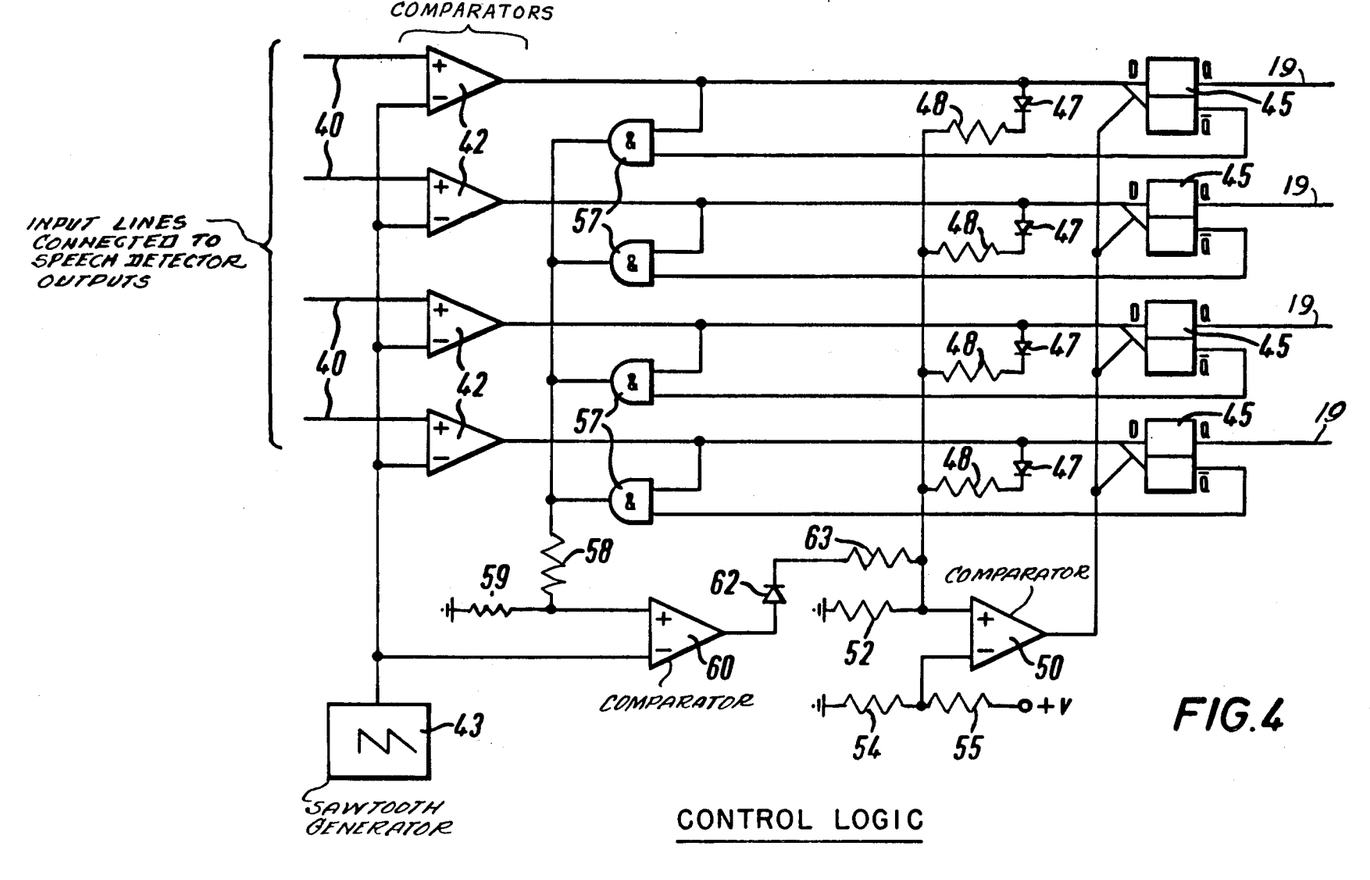
FIG. 4 is a circuit diagram of another part of the control unit of FIG. 2.

The control logic 18 is shown in more detail in FIG. 4. The control logic has four input lines identified generally at 40, each input line being connected to an output of one of the speech detectors. Each input line is connected to an associated comparator 42. Each comparator has a second input which is connected to a sawtooth generator 43. The output of each comparator 42 is connected to an associated D type flip flop 45. The normal Q output of each flip flop constitutes a control line 19 connected to one of the switches 11. The output of each comparator 42 is also connected by a respective diode 47 and resistor 48 to the non-inverting input of the comparator 50. Each diode 47 and each resistor 48 together with a resistor 52 form a potential divider from which the input to the comparator 50 is taken. The input to the inverting input of the comparator 50 is connected to the junction of two resistors 54 and 55 which are connected between earth and a potential supply +v. The potential at the junction of the two resistors 54 and 55 is chosen so that the output of the comparator 50 goes high when the outputs of two of the comparators 42 are high. The output of the comparator 50 constitutes a clock input for the D type flip flops 45. Thus, when the outputs of two of the comparators 42 go high, a clock input is provided for the D type flip flops. The outputs of the two flip flops which are connected to the comparators with the high outputs are latched to a high state and the two corresponding switches 11 of FIG. 2 are closed. The arrangement is such that the two loudest terminals are connected for open loop audio teleconference. These two terminals remain connected because of the latching action of the flip flops 45 which remain latched until a further terminal is admitted because of its louder speech signal. Provided there are always two active terminals the control logic as described above is sufficient. However, if there is no speech for a period and a person at one of the terminals not currently connected starts to speak, additional circuitry is required to enable the appropriate switch.

This additional circuitry consists of four AND gates 57, one associated with each of the comparators 42. One input to each AND gate is from its associated comparator output and the other is from the $\overline{Q}$ output of the associated D type flip flop 45. The outputs of the AND gates 57 are connected in common via a potential divider consisting of resistors 58 and 59 to the non-inverting input of a further comparator 60. The other input to the comparator 60 is from the sawtooth generator 43. The output of the comparator 60 is connected via a diode 62 and resistor 63 to the non-inverting input of the comparator 50.

The AND gates 57 and the comparator 60 are arranged to sense when the input to any of the flip flops 45 differs from the normal Q output. If such a condition exists, when the sawtooth waveform from the generator 43 is near minimum the clock signal is forced high enabling the appropriate flip flop 45 to switch. It is then possible for speech from the new terminal to be heard at the remaining terminals.

In operation of the circuit shown in FIG. 4 the sawtooth generator 43 is arranged to provide an input to each of the comparators 42 which starts high and falls with a period of around 1 millisecond to a minimum value which determines the threshold sensitivity. The arrangement is such that the output of the comparators 42 will go high if the signal from the speech detectors of FIGS. 2 and 3 exceeds the value of the sawtooth waveform. Since the sawtooth waveform starts high the first two comparators whose outputs go high after the beginning of the sawtooth waveform period will indicate to which inputs the two terminals with the louder speech signals are connected. The comparator 50 recognises the condition that two of the comparators 42 have produced a high output and produces an appropriate clock signal for the flip flops 45. The flip flops associated with the two comparators which have gone high are latched so that their outputs are high and the appropriate switches 11 are closed.

Thus, it will be seen that the control logic 18 can sense which pair of teleconference terminals are the loudest irrespective of the number talking and enable the appropriate switches 11. It holds the last pair of terminals to speak connected and admits a third terminal if a person at that terminal only starts to speak.

The control unit described above has been found to have a generally good performance. However, it does suffer from a few minor problems which may require some correction. A certain amount of voice clipping, although minimal, does occur but it is not readily apparent during normal conversation. A possible remedy is to include a delay line of the order of 5 to 10 milliseconds in the audio path immediately prior to the switches 11 of FIG. 2. This will provide the control logic with time to operate before the speech signal has reached the switch.

Figure 5:
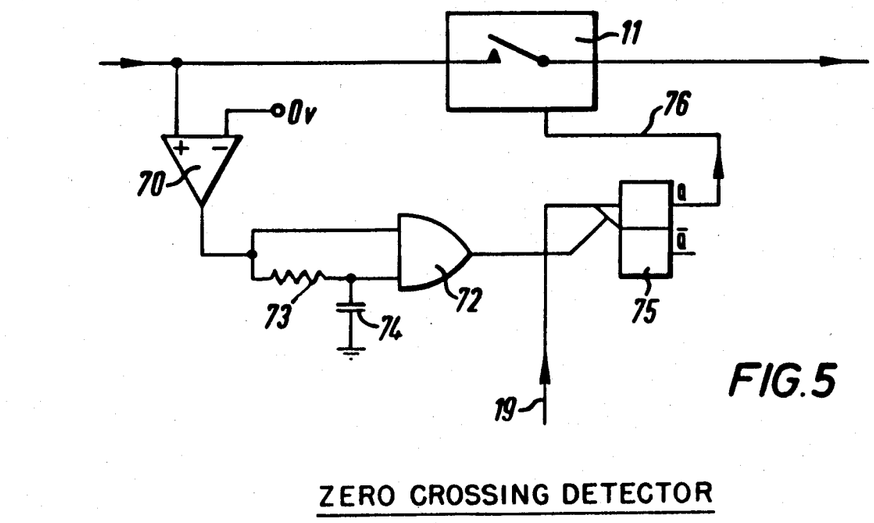
FIG. 5 is a circuit diagram of a zero crossing detector and switch which can be used with the control unit of FIG. 2.

Also audible clicks can occur when the switches 11 operate bringing about an abrupt change of signal level. This problem may be overcome by including a zero crossing detector which inhibits the switching action of the switch until the audio signal voltage is very close to zero. An example of a zero crossing detector which can be used is shown in FIG. 5. The circuit shown in FIG. 5 is for one switch only. The output from the amplifier 12 is connected to the non-inverting input of a comparator 70. The output of the comparator 70 is connected directly to one input of an exclusive OR-gate 72 and also via a resistor 73 and capacitor 74 to the other input of the OR-gate 72. The output of the exclusive OR-gate 72 is connected to the clock input of a flip flop 75 which is arranged to receive as an input the output from one of the flip flops 45 shown in FIG. 4. The Q output of the flip flop 75 forms a control line 76 for the switch 11.

In operation the output of the comparator 70 is arranged to change state each time the speech signal from its associated amplifier 12 passes through zero voltage. The output of the comparator 70 is applied to both inputs of the OR-gate 72, one of the inputs being delayed by the delay network consisting of the resistor 73 and capacitor 74. Thus, the exclusive OR-gate provides a short pulse of about 1 microsecond duration, depending on the time constant of the delay network, each time the input speech waveform passes through zero voltage. The pulse output from the OR-gate 72 clocks the flip flop 75 and thereby enables the switch 11. Thus the control signal for the switch 11 is inhibited until a clock signal is applied to the flip flop 75. By only enabling the switch 11 in the speech path when the speech signal is near zero, audible clicks associated with large and abrupt changes of signal level are avoided.

A further improvement to the control logic, useful when a third terminal is admitted by the system after a period of silence, can be provided if the logic is arranged to retain the last terminal to speak and to connect the new terminal in open loop teleconference with this previous terminal.

A final problem which is more fundamental is that of dynamic feedback. In an orderly meeting in which distant conferees are listening, the signals returned to the control unit speech detectors from the distant terminals will comprise mainly the current talkers voice emanating from the loudspeaker together with colourisations due to the acoustics of the room in which the terminal is located which are picked up by the microphones there. Since the loss between each terminal and the control unit is nominally equal, the feedback signals from each terminal will have a similar level. Further the precise level of the feedback signals will be effected by the acoustic properties of the different terminal rooms and will change with time as frequencies in the speech waveform excite different peaks in the room response. Hence the loudest signal received by the control logic, ignoring that coming from the terminal at which a conferee is actually talking, will vary quite rapidly with time causing the control logic to switch rapidly between the other terminals connecting each in turn with that in which the conferee is talking. If an audible click is heard each time a new terminal is switched in the effect can be very disconcerting. This problem can be overcome by the inclusion of the zero crossing detector described above, but the conferees may still hear the changes of terminal connected since they will probably have different room noise levels or acoustic properties. The problem can be overcome by including switched gain to the control circuitry. Alternatively it can be overcome by using a microprocessor control arrangement as will now be described with reference to FIG. 6.

Figure 6:
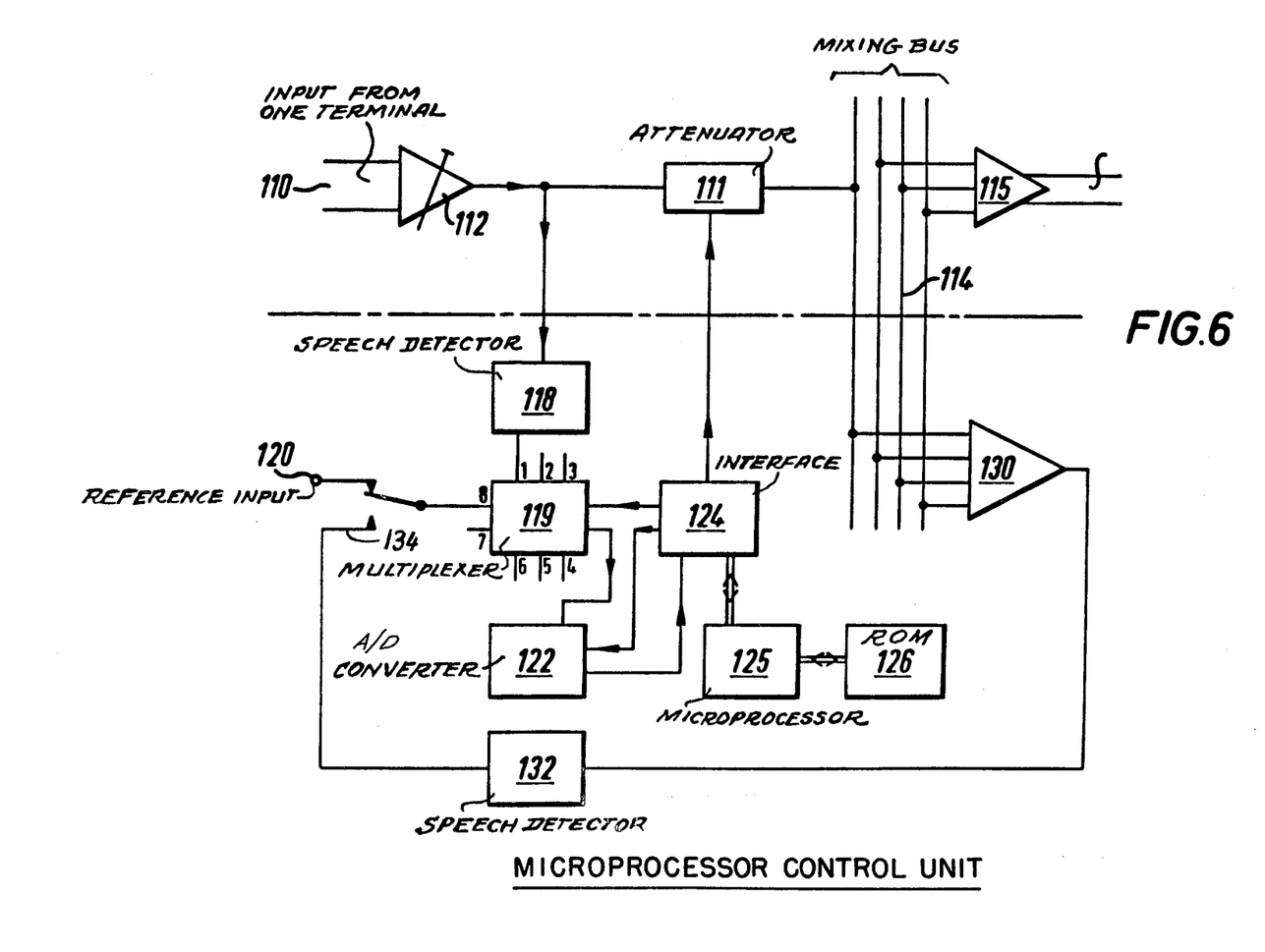
FIG. 6 is a block circuit diagram of a microprocessor control unit for controlling audio teleconference terminals.

Referring to FIG. 6 a control unit for multi-location teleconferencing has inputs from seven terminals, only one 110 of which is shown in FIG. 6. The input 110 is connected to a variable gain amplifier 112 the output of which is connected by an attentuator 111 to a mixing bus 114. The mixing bus connects to output amplifiers 115. This arrangement is similar to that described with reference to FIG. 2, the main difference being the use of attenuators 111 instead of the switches 11 shown in FIG. 2.

The output of the amplifier 112 is connected to a speech detector 118 and the output of the speech detector is connected to a multiplexer 119. The multiplexer 119 has 8 inputs, one for each of the seven terminals connected to the control unit, and an eighth which is connected to a reference input 120. The multiplexer has an output connected to an analogue to digital converter 122 which is connected via an interface 124 to a microprocessor 125. The microprocessor 125 has an associated read-only memory 126.

A further mixing amplifier 130 has inputs connected to the mixing bus 114 and the output of the amplifier 130 is connected via a speech detector 132 to a terminal 134.

In operation the multiplexer 119, under the control of the microprocessor 125, scans each of the inputs from the various terminals and connects them in turn to the analogue to digital converter 122. The output of the analogue to digital converter is fed to the microprocessor via the interface 124. The microprocessor can be arranged to recognise the two signals from the speech detectors 118 which have the highest signal level and to set the attenuators 111 associated with the terminals from which the two highest levels have been detected to zero value. The other attenuators have a high value attenuation. Thus, the two terminals with the higher signal levels are connected in open loop teleconference in a manner similar to that described with reference to FIG. 2. The speech detector 118 is similar to that described with reference to FIG. 3 above. However, the peak detector decay time constant in the FIG. 6 arrangement is reduced to around 10 milliseconds.

An advantage of the microprocessor control is that it can be used to introduce a variable hangover time to prevent unwanted switching caused by impulsive noise in the terminal room or on the telephone circuits. In this case, once an input from a terminal is deemed to be active, that is the output from the appropriate speech detector is greater than the reference input at terminal 120, it is assigned the hangover time of 10 milliseconds. At each successive sampling of the speech detector output the hangover time is increased by 10 milliseconds provided the signal is above the reference signal level. Once the signal has been above threshold for 50 milliseconds the hangover time is increased to 500 milliseconds. When the signal falls below the reference level the hangover time is decreased by 10 milliseconds at each successive sampling instant until it falls to zero, this time being the minimum value allowed. By using a variable hangover time in this way the probability of a terminal monopolising the system for a significant time is greatly reduced for other than speech signals.

In practice, however, the microprocessor control system is designed for a somewhat different operating principle to that of the hard wired logic control unit described above. At the sampling instant the total number of active terminals, that is those for which the output level of the associated speech detector is greater than the reference input level at terminal 120, are all admitted to the system. The system is kept stable by setting the attenuators 111 in accordance with equation 1 above. In this way if conferees at one or two terminals speak they are heard at the full level but if conferees at three or more terminals speak simultaneously they are heard at a progressively lower level. As in normal conversation however, this condition is readily recognised and one conferee will normally continue. If the discussion does get completely out of control the chairman can always call the meeting to order by raising his vocal level. The microprocessor system always retains the last two terminals to speak connected in open loop audio teleconference. The system has less audible clicks during switching then the hard wired control version and also slightly less initial syllable clipping, although both these problems can be detected. They can be overcome using the remedies described above with reference to the hard wired version.

The microprocessor control system as described above still suffers from dynamic feedback problem. It can be reduced slightly by raising the reference input level but this makes normal access to the system more difficult and conferees may have to raise their vocal level. One method of overcoming this problem is to introduce a dynamic reference level. This can be done using the amplifier 130. The inputs of this amplifier are taken from the output of each of the attenuators 111. The output of the mixing amplifier is fed to the speech detector 132 and the output from this speech detector can form the reference signal level at terminal 134. This is fed to the 8th port of the multiplexer.

This new reference signal represents the detected sum of the speech signals from active terminals and while a conferee is talking this should always be greater than his feedback signal from the terminals not currently connected to the control unit. Thus, the problem of random hunting between distant terminals while a conferee at one terminal is speaking is overcome. If a conferee at a third terminal wishes to break into a conversation he must raise his vocal level above that of the current talker. Also this arrangement reduces the probability of extraneous noises capturing the system while a conferee is speaking. When there is no speech present the summed reference signal drops to a very low level, decreasing the threshold and allowing easy access for any terminal.

Figure 7:
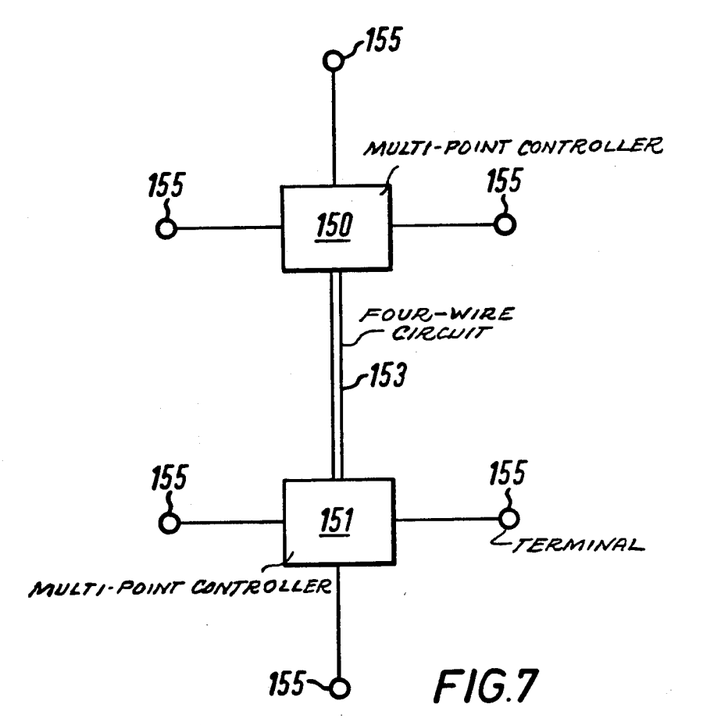
FIG. 7 illustrates the manner in which two control units can be connected.

The above arrangements as described are designed for use over private telephone circuits between the various terminals. The control unit can also be used as a basis for a public switched telephone network multipoint audio teleconference service. In this case the unit would be located at a public exchange (or an exchange forming part of a private network) and accessed via suitable exchange switching equipment. The problem with a PSTN based system is the varying circuit loss (attenuation) that will be obtained over the different circuits connecting the terminals to the central control unit. This problem can be alleviated by using a somewhat modified version of the control unit described in Patent Application No. 50517/77 on each port of the control unit to provide an equalised four-wire connection between each terminal and the control unit. An arrangement in which two multipoint controllers 150, 151 are connected by a four-wire (i.e. bidirectional) circuit 153 is also possible. It is also possible to interconnect controllers in a star arrangement.

We claim:

1. A control unit for controlling operation of a plurality of audio teleconference terminals comprising:
   a plurality of inputs, each being for connection to a respective teleconference terminal so that it can receive speech signals therefrom,
   switching means having high and low impedance conditions connecting each input to a plurality of outputs, each output being associated with a particular input and being for connection to a teleconference terminal,
   the switching means being operative to connect the input associated with a low impedance-conditioned switching means to all outputs other than the one with which it is associated, and
   control means, responsive to speech signals from said inputs, connected to control said switching means such that at least some of said inputs at which speech signals are received are connected to said outputs whereby at least two terminals can be connected in open loop teleconference and the remaining terminals can receive the conference.

2. A control unit as claimed in claim 1 wherein said switching means comprises plural switches which can be open or closed.

3. A control unit as claimed in claim 1 wherein each input is connected to said switching means by a variable gain amplifier.

4. A control unit as claimed in claim 1 wherein each output has an amplifier and said switching means is connected to the output amplifier by a mixing bus.

5. A control unit as claimed in claim 1 wherein said control means includes a microprocessor which is arranged to sequentially scan the inputs to the control unit and control operation of said switching means such that those inputs which receive speech signals are connected in open loop audio teleconference.

6. A control unit as claimed in claim 5 wherein said switching means comprises plural switches, each having an attenuator whose attenuation is normally high, the attenuation value of each attenuator being adjustable by said microprocessor such that if speech signals are received from two terminals the signals are transmitted at full level but if speech signals are received from more than two terminals they are transmitted at progressively lower levels.

7. A control unit as claimed in claim 6 wherein each input of the control unit is connected to a speech detector.

8. A control unit as claimed in claim 7 wherein each speech detector is connected to a multiplexer, the multiplexer being connected by an analogue to digital converter and an interface circuit to the microprocessor.

9. A control unit as claimed in claim 5 wherein the microprocessor is arranged to connect a previously inactive terminal in open loop teleconference with another terminal when the speech level received from the previously inactive terminal is greater than that represented by a reference signal generated by a speech detector.

10. A control unit for controlling an open-loop audio teleconference between three or more audio teleconference terminals, said control unit comprising:

means connected to all terminals for detecting the relative levels of audio signals being transmitted by each terminal; and means connected to said detecting means for automatically and selectively coupling into an open-loop audio teleconference circuit the pair of said terminals having the highest detected levels of audio signals while yet maintaining all remaining ones of said terminals connected to receive the audio signals originating from either of the selected pair of terminals.

11. A control unit for controlling operation of a plurality of audio teleconference terminals comprising:

a plurality of inputs, each being for connection to a respective teleconference terminal so that it can receive speech signals therefrom, switching means having high and low impedance conditions connecting each input to a plurlality of outputs, each output being associated with a particular input and being for connection to a teleconference terminal, the switching means being operative to connect the input associated with a low impedance-conditioned switching means to all outputs other than the one with which it is associated, and control means, responsive to speech signals from said inputs, connected to control said switching means such that at least some of said inputs at which speech signals are received are connected to said outputs whereby at least two terminals can be connected in open loop teleconference and the remaining terminals can receive the conference, said switching means including plural switches which can be open or closed, and said control means including, a plurality of speech detectors, one associated with each input, a comparator connected to the output of each speech detector, each comparator being arranged to change state when the signal it receives from its associated speech detector exceeds a predetermined level, a bistable state circuit connected to each of said switches, and means for sensing when two of said comparators change state to produce a clock signal for the bistable state circuits whereby the bistable state circuits associated with said two comparators produce signals to effect closing of two switches.

12. A control unit as claimed in claim 11 wherein each comparator has a reference input and means are provided for applying a sawtooth waveform to said reference input.

13. A control unit as claimed in claim 11 wherein each speech detector comprises a rectifier, a peak detector, a trough detector and a differential amplifier for producing a signal indicative of the differential amplifier for producing a signal indicative of the difference between the peak and trough detector outputs.

14. A control unit for controlling operation of a plurality of audio teleconference terminals comprising:

a plurality of inputs, each being for connection to a respective teleconference terminal so that it can receive speech signals therefrom, switching means including plural switches, each switch having high and low impedance conditions, said switching means connecting each input to a plurality of outputs, each output being associated with a particular input and being for connection to a teleconference terminal, the switching means being operative to connect the input associated with a low impedance-conditioned switching means to all outputs other than the one with which it is associated, and control means, responsive to speech signals from said inputs, connected to control said switching means such that at least some of said inputs at which speech signals are received are connected to said outputs, whereby at least two terminals can be connected in open loop teleconference and the remaining terminals can receive the conference, each of said switches having a delay circuit connected thereto for delaying operation thereof until the speech level in the speech path to the switching means is substantially zero.

* * * * *